(12) United States Patent
Matsumura et al.

(10) Patent No.: US 12,501,449 B2
(45) Date of Patent: Dec. 16, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 368 days.

(21) Appl. No.: 18/029,813

(22) PCT Filed: Oct. 2, 2020

(86) PCT No.: PCT/JP2020/037584
§ 371 (c)(1),
(2) Date: Mar. 31, 2023

(87) PCT Pub. No.: WO2022/070411
PCT Pub. Date: Apr. 7, 2022

(65) Prior Publication Data
US 2023/0413283 A1    Dec. 21, 2023

(51) Int. Cl.
*H04W 72/232* (2023.01)
*H04L 1/00* (2006.01)
*H04L 1/08* (2006.01)

(52) U.S. Cl.
CPC .......... *H04W 72/232* (2023.01); *H04L 1/0027* (2013.01); *H04L 1/08* (2013.01)

(58) Field of Classification Search
CPC ....... H04L 1/0025; H04L 1/0027; H04L 1/08; H04L 1/1854; H04L 1/1864; H04W 16/28; H04W 72/232
See application file for complete search history.

(56) References Cited

U.S. PATENT DOCUMENTS 11,082,154 B2 *   8/2021   Seo .................. H04L 5/0023
11,438,965 B2 *   9/2022   Kakishima .......... H04L 1/1887
(Continued)

FOREIGN PATENT DOCUMENTS

CN    111615805 A  *   9/2020   .......... H04L 1/1819
CN    111615805 B  *   5/2023   .......... H04L 1/1819
(Continued)

OTHER PUBLICATIONS

Office Action issued in Japanese Application No. 2022-553401, mailed Nov. 26, 2024 (6 pages).
(Continued)

*Primary Examiner* — Eric Nowlin
(74) *Attorney, Agent, or Firm* — Osha Bergman Watanabe & Burton LLP

(57) ABSTRACT

A terminal according to one aspect of the present disclosure includes a receiving section that receives TCI state information indicating a plurality of transmission configuration indication (TCI) states applicable to multiple types of channels and that receives first downlink control information indicating one TCI state of the plurality of TCI states, and a control section that applies the one TCI state to a first signal after timing at which specific time passes from any one of the first downlink control information and a first uplink channel based on the first downlink control information. According to one aspect of the present disclosure, it is possible to appropriately determine information related to QCL.

6 Claims, 19 Drawing Sheets

(56) References Cited

U.S. PATENT DOCUMENTS

| | | | |
|---|---|---|---|
| 12,155,444 B2* | 11/2024 | Zhang | H04W 56/001 |
| 2020/0359459 A1* | 11/2020 | Kakishima | H04L 5/0094 |
| 2021/0050936 A1* | 2/2021 | Seo | H04L 5/0053 |
| 2022/0190902 A1* | 6/2022 | Zhang | H04W 56/001 |
| 2023/0284221 A1* | 9/2023 | Gao | H04L 5/0044 |
| | | | 370/329 |
| 2024/0064768 A1* | 2/2024 | Matsumura | H04L 1/1864 |
| 2024/0406815 A1* | 12/2024 | Lin | H04W 36/0072 |
| 2025/0048384 A1* | 2/2025 | Lai | H04W 36/04 |
| 2025/0056341 A1* | 2/2025 | Cirik | H04W 36/0055 |
| 2025/0070945 A1* | 2/2025 | Liu | H04L 1/1861 |
| 2025/0081066 A1* | 3/2025 | Khoshkholgh Dashtaki | H04W 36/083 |

FOREIGN PATENT DOCUMENTS

| | | | | |
|---|---|---|---|---|
| CN | 116783966 A * | 9/2023 | | H04L 1/1887 |
| CN | 119325142 A * | 1/2025 | | H04B 7/0617 |
| EP | 4280652 A1 * | 11/2023 | | H04L 1/1887 |
| JP | 2023535521 A | 8/2023 | | |
| JP | 2025131872 A * | 9/2025 | | |
| WO | 2022021426 A1 | 2/2022 | | |
| WO | WO-2025030481 A1 * | 2/2025 | | H04W 72/12 |
| WO | WO-2025054254 A1 * | 3/2025 | | H04W 36/0061 |

OTHER PUBLICATIONS

International Search Report issued in PCT/JP2020/037584 on May 11, 2021 (1 page).
Written Opinion of the International Searching Authority issued in PCT/JP2020/037584 on May 11, 2021 (4 pages).
ZTE; "Enhancements on Multi-beam Operation"; 3GPP TSG RAN WG1 Meeting #102-e, R1-2005454; e-Meeting; Aug. 17-28, 2020 (11 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

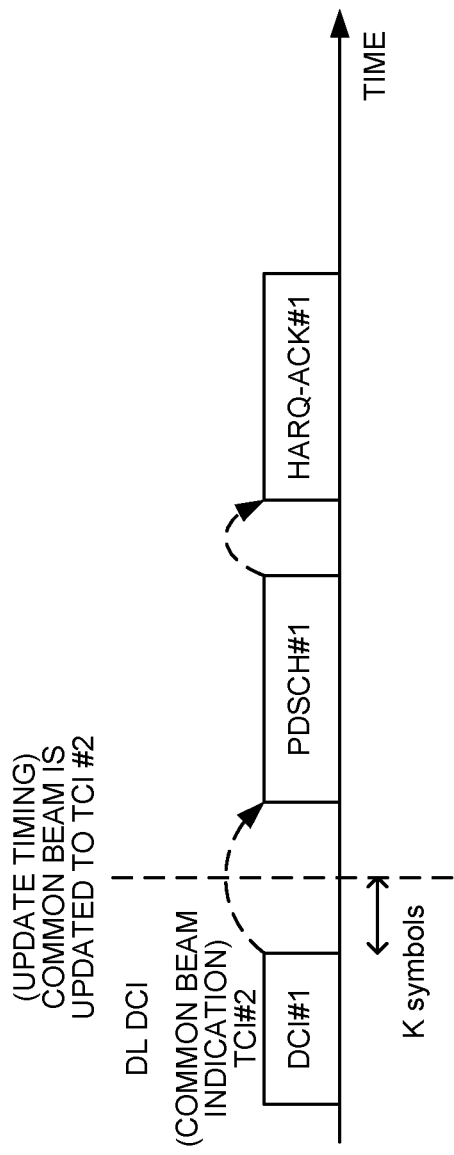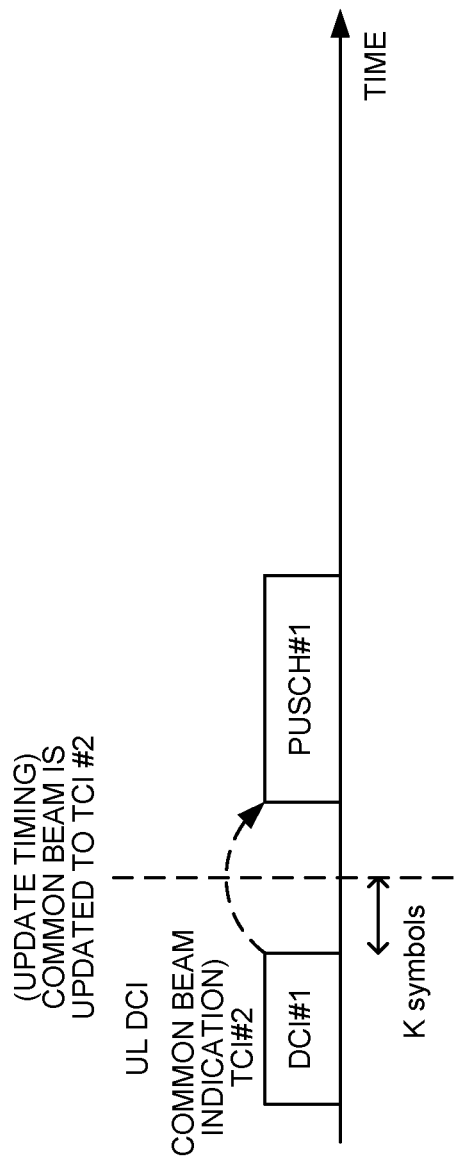

FIG. 14A

DL DCI

| | FAILURE TO RECEIVE PDSCH | SUCCESS IN RECEIVING PDSCH | FAILURE TO RECEIVE HARQ | SUCCESS IN RECEIVING HARQ |
|---|---|---|---|---|
| FAILURE TO RECEIVE DCI | | (a) UE DOES NOT TRANSMIT HARQ | | |
| SUCCESS IN RECEIVING DCI | UE TRANSMITS NACK | UE TRANSMITS ACK | (b) HARQ IS NOT RECEIVED | HARQ IS RECEIVED | gNB FAILS TO DISTINGUISH BETWEEN (a) AND (b)

FIG. 14B

UL DCI

| | FAILURE TO RECEIVE PUSCH | SUCCESS IN RECEIVING PUSCH |
|---|---|---|
| FAILURE TO RECEIVE DCI | (c) UE DOES NOT TRANSMIT PUSCH | |
| SUCCESS IN RECEIVING DCI | (d) PUSCH IS NOT RECEIVED | PUSCH IS RECEIVED | gNB FAILS TO DISTINGUISH BETWEEN (c) AND (d)

| UNIFIED TCI FIELD VALUE IN DCI | UL COMMON BEAM AND DL COMMON BEAM |
|---|---|
| 000 | UL TCI=TCI#1, DL TCI=TCI#2 |
| 001 | UL TCI=TCI#3, DL TCI=TCI#4 |
| ... | ... |
| 111 | UL TCI=TCI#15, DL TCI=TCI#16 |

FIG. 15

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), a user terminal (terminal, User Equipment (UE)) that controls transmission/reception processing on the basis of information related to quasi-co-location (QCL) (QCL assumption/Transmission Configuration Indication (TCI) state/spatial relation) is under study.

However, there is a case where the information related to the QCL is indefinite. Unless the information related to the QCL is definite, communication quality reduction, throughput reduction, and the like may occur.

Thus, an object of the present disclosure is to provide a terminal, a radio communication method, and a base station that appropriately determine information related to QCL.

Solution to Problem

A terminal according to one aspect of the present disclosure includes a receiving section that receives TCI state information indicating a plurality of transmission configuration indication (TCI) states applicable to multiple types of channels and that receives first downlink control information indicating one TCI state of the plurality of TCI states, and a control section that applies the one TCI state to a first signal after timing at which specific time passes from any one of the first downlink control information and a first uplink channel based on the first downlink control information.

Advantageous Effects of Invention

According to one aspect of the present disclosure, it is possible to appropriately determine information related to QCL.

BRIEF DESCRIPTION OF DRAWINGS

FIGS. 7A and 7B are each a diagram to show an example of an update timing according to a first embodiment.

FIGS. 14A and 14B are each a diagram to show an example of a discrepancy in recognition of a common beam.

FIG. 15 is a diagram to show an example of aspect 3-1-2.

Figure 1:
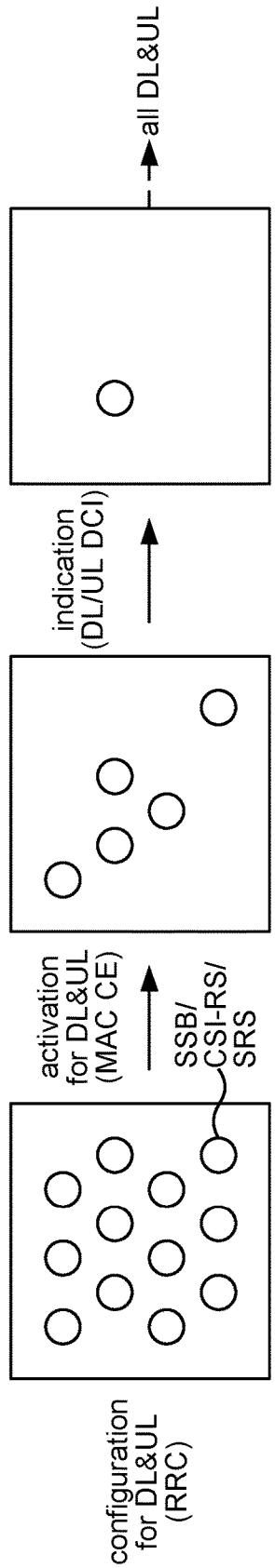
FIG. 1 is a diagram to show an example of a common beam for both DL and UL.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) in a UE regarding at least one of a signal and a channel (which is expressed as a signal/channel) based on a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread
QCL type B (QCL-B): Doppler shift and Doppler spread
QCL type C (QCL-C): Doppler shift and average delay
QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS to have a relationship of QCL type X with (a DMRS for) a certain channel/signal, and this RS may be referred to as a QCL source of QCL type X in the TCI state.

(Pathloss RS)

Pathloss $PL_{b,f,c}(q_d)$ [dB] in transmit power control for each of the PUSCH, PUCCH, and SRS is calculated by the UE with index $q_d$ of a reference signal (RS, pathloss reference RS (PathlossReferenceRS)) for a downlink BWP associated with active UL BWP b for carrier f in serving cell c. In the present disclosure, the pathloss reference RS, a pathloss (PL)-RS, index $q_d$, an RS used for pathloss calculation, and an RS resource used for pathloss calculation may be interchangeably interpreted. In the present disclosure, calculate, estimate, measure, and track may be interchangeably interpreted.

Whether an existing system for higher layer filtered RSRP for pathloss measurement is changed when the pathloss RS is updated by a MAC CE is under study.

When the pathloss RS is updated by the MAC CE, pathloss measurement based on L1-RSRP may be applied. At an available timing after the MAC CE for updating the pathloss RS, higher layer filtered RSRP may be used for pathloss measurement, and L1-RSRP may be used for pathloss measurement before the higher layer filtered RSRP is applied. At an available timing after the MAC CE for updating the pathloss RS, higher layer filtered RSRP may be used for pathloss measurement, and higher layer filtered RSRP for a previous pathloss RS may be used before that timing. The higher layer filtered RSRP may be used for pathloss measurement in a manner similar to that of operation in Rel. 15, and the UE may track all pathloss RS candidates configured by RRC. A maximum number of pathloss RSs configurable by the RRC may depend on a UE capability. When the maximum number of pathloss RSs configurable by the RRC is X, pathloss RS candidates being X or less may be configured by the RRC, and a path loss RS may be selected by the MAC CE from the configured pathloss RS candidates. The maximum number of pathloss RSs configurable by the RRC may be 4, 8, 16, 64, or the like.

In the present disclosure, the higher layer filtered RSRP, filtered RSRP, and layer 3 filtered RSRP may be interchangeably interpreted.

(Default TCI State/Default Spatial Relation/Default PL-RS)

In an RRC connected mode, in both a case where information of TCI in DCI (higher layer parameter TCI-PresentInDCI) is set to "enabled" and a case where the information of TCI in DCI is not configured, when time offset between reception of DL DCI (DCI to schedule a PDSCH) and a corresponding PDSCH (PDSCH scheduled by the DCI) is less than a threshold value (timeDurationForQCL) (application condition, first condition), and in a case of non-cross carrier scheduling, a TCI state (default TCI state) for the PDSCH may be a TCI state with the lowest CORESET ID in the latest slot in an active DL BWP for that CC (for a specific UL signal). In cases other than the case, the TCI state (default TCI state) for the PDSCH may be a TCI state with the lowest TCI state ID of a PDSCH in an active DL BWP for a scheduled CC.

In Rel. 15, individual MAC CEs for a MAC CE for PUCCH spatial relation activation/deactivation and a MAC CE for SRS spatial relation activation/deactivation are necessary. A PUSCH spatial relation follows the SRS spatial relation.

In Rel. 16, at least one of the MAC CE for PUCCH spatial relation activation/deactivation and the MAC CE for SRS spatial relation activation/deactivation may not be used.

If both a spatial relation and a PL-RS for a PUCCH are not configured in FR2 (application condition, second condition), default assumption for the spatial relation and PL-RS (default spatial relation and default PL-RS) is applied to the PUCCH. If both a spatial relation and a PL-RS for an SRS (SRS resource for the SRS or SRS resource corresponding to SRI in DCI format 0_1 to schedule a PUSCH) are not configured in FR2 (application condition, second condition), default assumption for the spatial relation and PL-RS (default spatial relation and default PL-RS) is applied to the PUSCH scheduled by DCI format 0_1, and the SRS.

If a CORESET is configured in an active DL BWP on that CC (application condition), the default spatial relation and default PL-RS may be a TCI state or QCL assumption for a CORESET having the lowest CORESET ID in the active DL BWP. If a CORESET is not configured in the active DL BWP on that CC, the default spatial relation and default PL-RS may be an active TCI state having the lowest ID for a PDSCH in the active DL BWP.

In Rel. 15, a spatial relation for a PUSCH scheduled by DCI format 0_0 follows a spatial relation for a PUCCH resource having the lowest PUCCH resource ID, out of active spatial relations for PUCCHs on the same CC. A network needs to update PUCCH spatial relations on all SCells even when the PUCCH is not transmitted on the SCell.

In Rel. 16, PUCCH configuration for the PUSCH scheduled by DCI format 0_0 is unnecessary. When an active PUCCH spatial relation or a PUCCH resource for the PUSCH scheduled by DCI format 0_0 is absent on an active UL BWP in that CC (application condition, second condition), the default spatial relation and default PL-RS are applied to the PUSCH.

A condition for application of the default spatial relation/default PL-RS for the SRS may include a case that an information element for enabling a default beam pathloss for the SRS (higher layer parameter enableDefaultBeamPlForSRS) is set to "enabled." A condition for application of the default spatial relation/default PL-RS for the PUCCH may include a case that an information element for enabling a default beam pathloss for the PUCCH (higher layer parameter enableDefaultBeamPlForPUCCH) is set to "enabled." A condition for application of the default spatial relation/default PL-RS for the PUSCH scheduled by DCI format 0_0 may include a case that an information element for enabling a default beam pathloss for the PUSCH scheduled by DCI format 0_0 (higher layer parameter enableDefaultBeamPlForPUSCH0_0) is set to "enabled."

The above-described threshold value may be referred to as a time length (time duration) for QCL, "timeDurationForQCL," "Threshold," "Threshold for offset between a DCI indicating a TCI state and a PDSCH scheduled by the DCI," "Threshold-Sched-Offset," a schedule offset threshold value, a scheduling offset threshold value, or the like.

(Unified/Common TCI Framework)

According to a unified TCI framework, UL and DL channels can be controlled by a common framework. Instead of defining a TCI state or a spatial relation for each channel in a manner similar to that of Rel. 15, the unified TCI framework may indicate a common beam and apply the common beam to all UL and DL channels, or may apply a UL common beam to all UL channels and apply a DL common beam to all DL channels.

One common beam for both DL and UL or a DL common beam and a UL common beam (two common beams in total) are under study.

The UE may assume the same TCI state (joint TCI state, joint TCI state pool, joint common TCI state pool) for the UL and DL.

In an example of FIG. 1, RRC configures a plurality of TCI states (joint common TCI state pool) for both of the DL and UL. Each of the plurality of TCI states may be an SSB, a CSI-RS, or an SRS. A MAC CE may activate some of the plurality of configured TCI states. DCI may indicate at least one of the plurality of activated TCI states.

Default beams for the UL and DL may be unified by MAC CE-based beam management (MAC CE-level beam indication). The default beams may be unified with a default UL beam (spatial relation) by updating a default TCI state for the PDSCH.

A common beam/unified TCI state from the same TCI state pool for both of the UL and DL (joint common TCI state pool) may be indicated by DCI-based beam management (DCI-level beam indication). M (>1) TCI states may be activated by the MAC CE. UL/DL DCI may select one TCI state from M active TCI states. The selected TCI state may be applied to channels/RSs for both of the UL and DL.

The UE may assume different TCI states (separate TCI states, separate TCI state pools, UL separate TCI state pool and DL separate TCI state pool, separate common TCI state pools, UL common TCI state pool and DL common TCI state pool) for the respective UL and DL.

Figure 2:
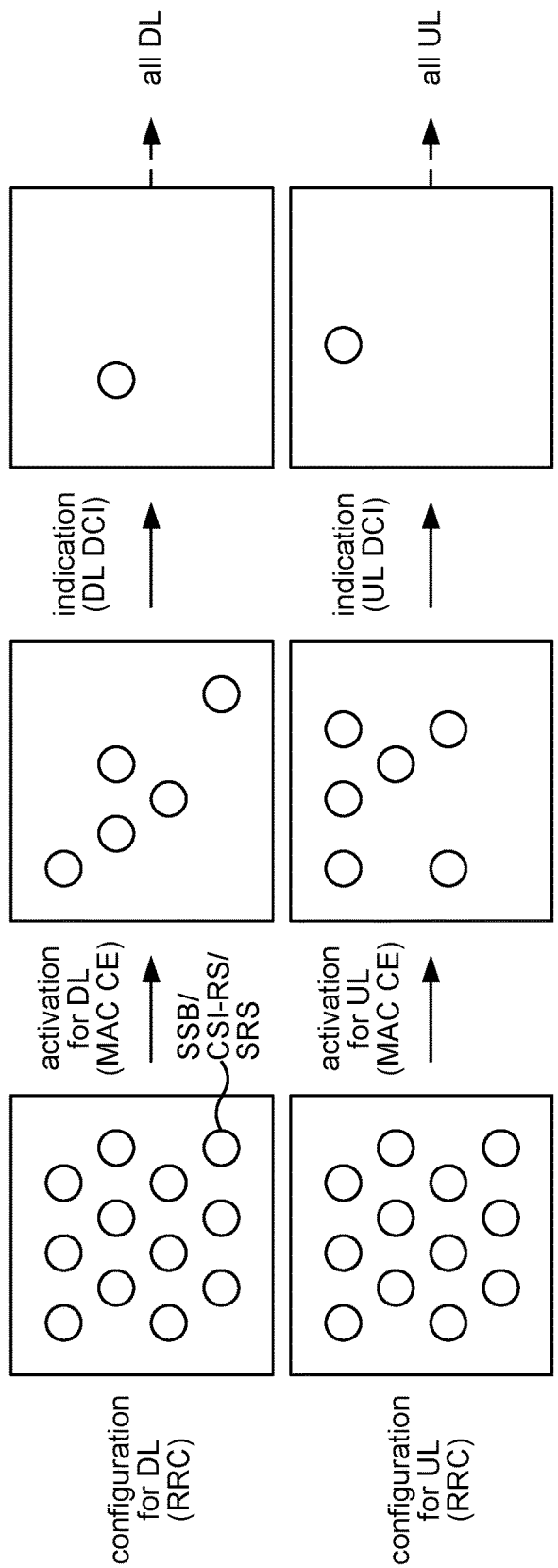
FIG. 2 is a diagram to show an example of a DL common beam and a UL common beam.

In an example of FIG. 2, RRC (parameter, information element) may configure a plurality of TCI states (pools) for respective UL and DL channels.

A MAC CE may select (activate) one or more (for example, multiple) TCI states (sets) for the respective UL and DL channels. The MAC CE may activate two sets of TCI states.

DL DCI may select (indicate) one or more (for example, one) TCI states. This TCI state may be applied to one or more DL channels. The DL channels may be PDCCHs/PDSCHs/CSI-RSs. The UE may determine a TCI state for each DL channel/RS by using TCI state operation (TCI framework) in Rel. 16.

UL DCI may select (indicate) one or more (for example, one) TCI states. This TCI state may be applied to one or more UL channels. The UL channels may be PUSCHs/SRSs/PUCCHs.

As use cases for separate common TCI state pools, use case 0, use case 1, and use case 2 below are under study.

[Use Case 0]

The UE uses different UL beams originating from maximum permitted exposure (MPE).

Figure 3:
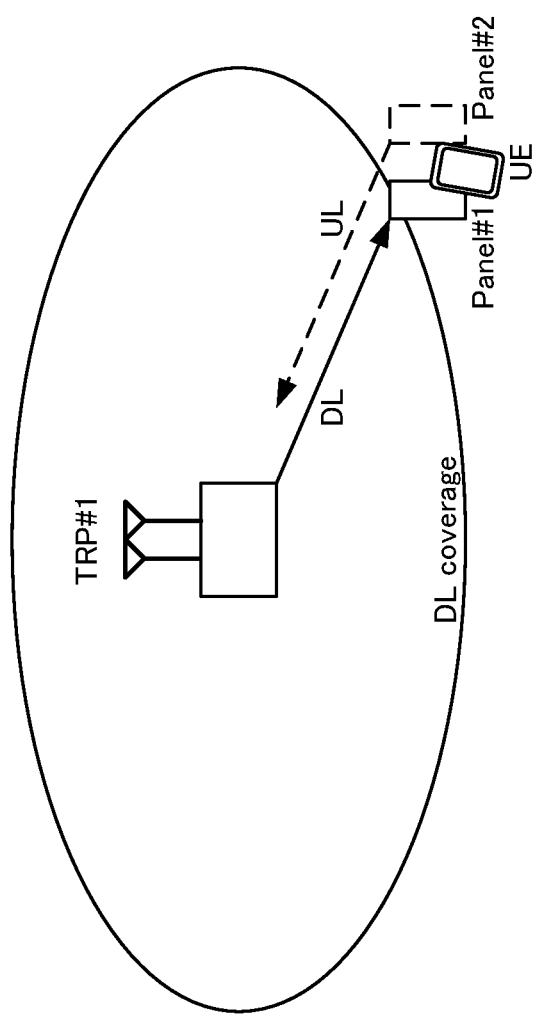
FIG. 3 is a diagram to show an example of use case 0.

In an example of FIG. 3, UL of panel #1 receives an MPE issue, and the UE uses panel #2 for UL.

[Use Case 1]

The UE uses different UL beams originating from UL signal strength.

Figure 4:
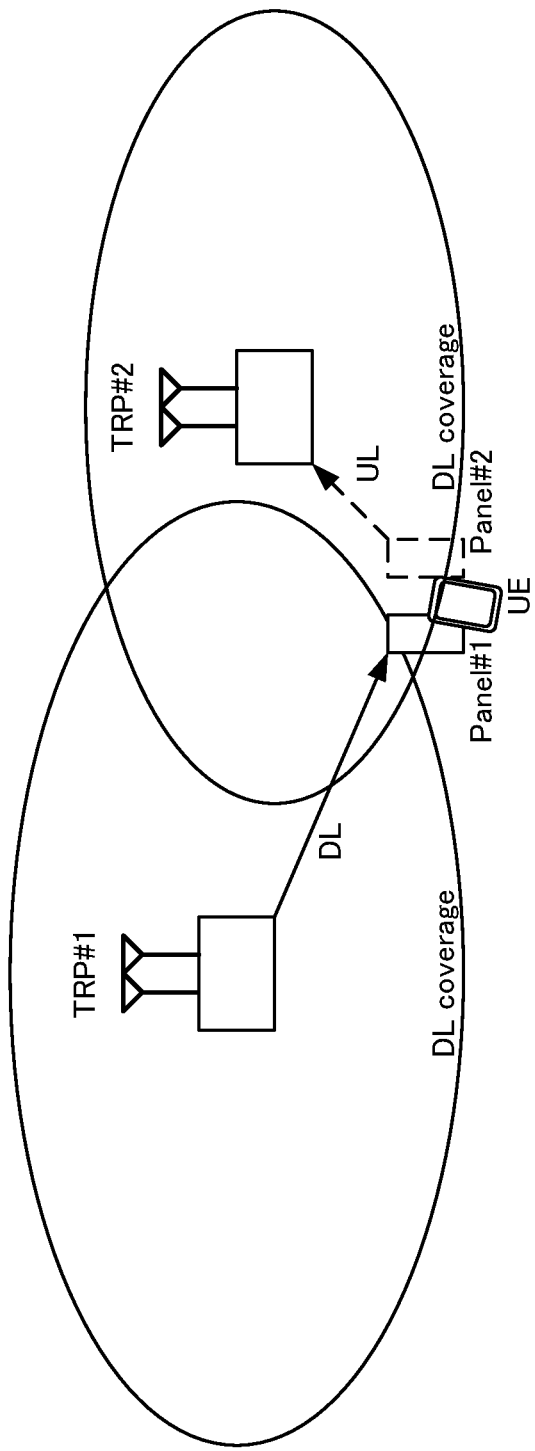
FIG. 4 is a diagram to show an example of use case 1.

In an example of FIG. 4, a distance between the UE and TRP (cell, base station) #1 is longer than a distance between the UE and TRP #2. Here, L1-RSRP of panel #1 is higher than L1-RSRP of panel #2, and UL transmit power of panel #2 is higher than UL transmit power of panel #1. The UE uses panel #1 for DL from TRP #1, and uses panel #2 for UL to TRP #2.

[Use Case 2]

The UE uses different UL beams originating from UL load balance.

Figure 5:
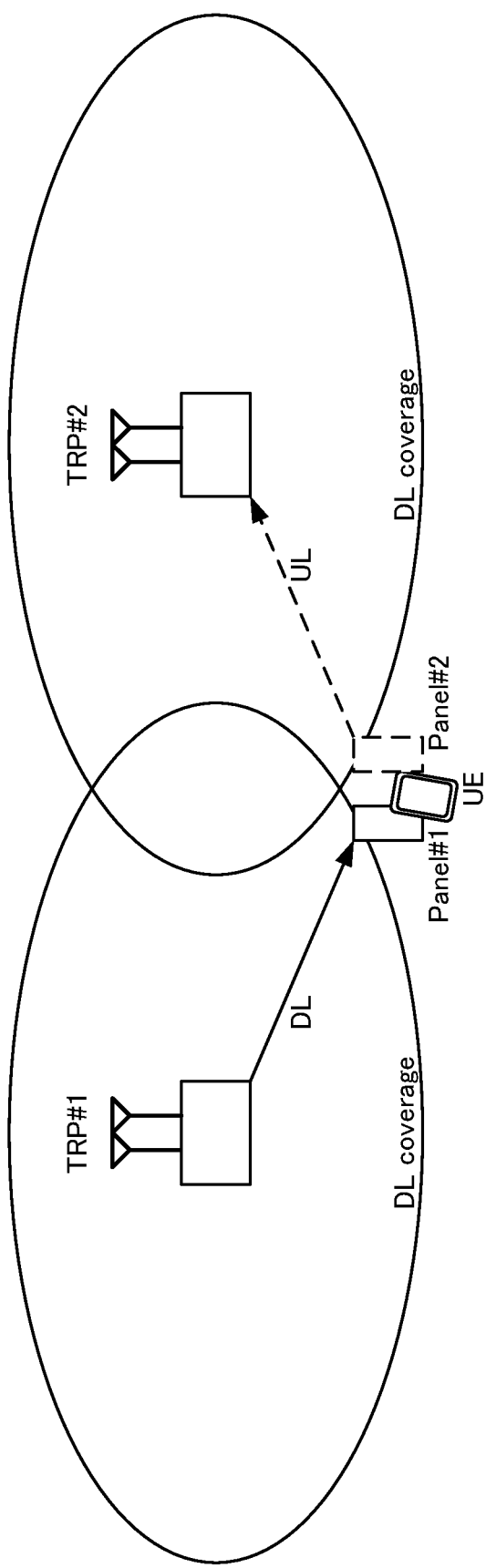
FIG. 5 is a diagram to show an example of use case 2.

In an example of FIG. 5, L1-RSRP of panel #1 is higher than L1-RSRP of panel #2, and UL load of panel #2 is lower than UL load of panel #1. The UE uses panel #1 for DL from TRP #1, and uses panel #2 for UL to TRP #2.

It is conceivable that more scenarios having different requirements are to be studied. For example, in multi-TRP transmission, high-speed train (HST) transmission, inter-cell mobility in a period in which there is a possibility that the UE connects to two cells, and the like, a common beam for respective TRPs or cells may vary.

In this case, the UE may include multiple panels for FR2. In this case, a common beam for respective UE panels may vary.

For DCI indication for a common beam (common TCI state), a TCI field in DL DCI may be reused, or a new field (for example, a unified TCI field) in the DL DCI may be used. The DL DCI, PDSCH scheduling DCI, and DCI format 1_1 or 1_2 may be interchangeably interpreted.

For DCI indication for a common beam (common TCI state), a new field (for example, a unified TCI field) in UL DCI may be used. The UL DCI, PUSCH scheduling DCI, and DCI format 0_1 or 0_2 may be interchangeably interpreted.

Figure 6A:
FIGS. 6A and 6B are each a diagram to show an example of an update timing of a common beam.
Figure 6B:

Feedback on DCI indication for a common beam (common TCI state) is under study. If reception of the DCI indication for the common beam has failed, a base station misrecognizes the common beam. Thus, a case that timing of update of the common beam is timing after the UE transmits feedback on the DCI indication is under study. For example, as shown in FIG. 6A, when the DL DCI indicates the common beam (TCI #2), the common beam is updated (to TCI #2) after the UE transmits ACK/NACK (HARQ-ACK information) on a PUCCH/PUSCH. For example, as shown in FIG. 6B, when the UL DCI indicates the common beam (TCI #2), the common beam is updated (to TCI #2) after the UE transmits the PUSCH.

However, the timing of the common beam update has not been fully studied. Unless the timing of the common beam update is definite, a discrepancy in recognition of the common TCI state between the UE and the base station may arise, and deterioration in communication quality, deterioration in throughput, and the like may occur.

Thus, the inventors of the present invention came up with the idea of a method for updating a TCI state.

Embodiments according to the present disclosure will be described in detail with reference to the drawings as follows. The radio communication methods according to respective embodiments may each be employed individually, or may be employed in combination.

In the present disclosure, "A/B/C" and "at least one of A, B, and C" may be interchangeably interpreted. In the present disclosure, a cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, to support, to control, to be able to control, to operate, and to be able to operate may be interchangeably interpreted.

In the present disclosure, configure, activate, update, indicate, enable, specify, and select may be interchangeably interpreted.

In the present disclosure, a MAC CE and an activation/deactivation command may be interchangeably interpreted.

In the present disclosure, the higher layer signaling may be, for example, any one or combinations of Radio Resource Control (RRC) signaling, Medium Access Control (MAC) signaling, broadcast information, and the like. In the present disclosure, RRC, RRC signaling, an RRC parameter, a higher layer, a higher layer parameter, an RRC information element (IE), and an RRC message may be interchangeably interpreted.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, a beam, a spatial domain filter, a spatial setting, a TCI state, a UL TCI state, a unified TCI state, a unified beam, a common TCI state, a common beam, TCI assumption, QCL assumption, a QCL parameter, a spatial domain reception filter, a UE spatial domain reception filter, a UE receive beam, a DL beam, a DL receive beam, DL precoding, a DL precoder, a DL-RS, an RS of QCL type D in a TCI state/QCL assumption, an RS of QCL type A in a TCI state/QCL assumption, a spatial relation, a spatial domain transmission filter, a UE spatial domain transmission filter, a UE transmit beam, a UL beam, a UL transmit beam, UL precoding, a UL precoder, and a PL-RS may be interchangeably interpreted. In the present disclosure, a QCL type X-RS, a DL-RS associated with QCL type X, a DL-RS having QCL type X, a source of a DL-RS, an SSB, a CSI-RS, and an SRS may be interchangeably interpreted.

UL DCI, DCI to schedule a UL channel (for example, a PUSCH), and DCI format 0_x (x=0, 1, 2, . . . ) may be interchangeably interpreted. DL DCI, DCI to schedule a DL channel (PDSCH), and DCI format 1_x (x=0, 1, 2, . . . ) may be interchangeably interpreted.

In the present disclosure, HARQ-ACK information, ACK, and NACK may be interchangeably interpreted.

In the present disclosure, a link direction, downlink (DL), uplink (UL), and one of UL and DL may be interchangeably interpreted.

In the present disclosure, a pool, a set, a group, and a list may be interchangeably interpreted.

In the present disclosure, a common beam, a unified TCI state, a TCI state applicable to DL and UL, a TCI state applied to a plurality (multiple types) of channels/RSs, a TCI state applicable to multiple types of channels/RSs, and a PL-RS may be interchangeably interpreted.

In the present disclosure, a plurality of TCI states configured by RRC, a plurality of TCI states activated by a MAC CE, a pool, a TCI state pool, an active TCI state pool, a common TCI state pool, a joint TCI state pool, a separate TCI state pool, a UL common TCI state pool, a DL common TCI state pool, a common TCI state pool configured/activated by RRC/MAC CE, and TCI state information may be interchangeably interpreted.

(Radio Communication Method)

A channel/RS to which the common beam is applied may be a PDSCH/HARQ-ACK information/PUCCH/PUSCH/CSI-RS/SRS.

DCI to indicate the common beam and DCI including a specific field may be interchangeably interpreted. The specific field may be an existing TCI field, or may be a new field for common beam indication (for example, a unified TCI field).

First Embodiment

A common beam may be updated after specific time from reception of DCI including a specific field for common beam (common TCI state) indication (update timing).

The specific time may be K symbols. K may be defined in specifications, may be configured by a higher layer, or may be reported by a UE as a UE capability.

A case that it is not assumed that the UE receives DCI including both an existing TCI field and a new field for common beam indication may be defined. Therefore, DCI overhead can be suppressed.

In an example of FIG. 7A, the UE receives DL DCI to indicate the common beam (TCI #2). The common beam may be updated (to TCI #2) after K symbols from a final symbol of a PDCCH to deliver the DCI. Timing of the common beam update may be timing before a start symbol of a PDSCH scheduled by the DCI, or may be timing before a start symbol of HARQ-ACK information (PUCCH/PUSCH) for the PDSCH.

In an example of FIG. 7B, the UE receives UL DCI to indicate the common beam (TCI #2). The common beam may be updated (to TCI #2) after K symbols from a final symbol of a PDCCH to deliver the DCI. Timing of the common beam update may be timing before a start symbol of a PUSCH scheduled by the DCI.

According to a first embodiment described above, it is possible to update a common beam more quickly. Therefore, it is possible to adapt to change in a communication environment more quickly, and communication quality can be enhanced.

Second Embodiment

If reception of DCI including a specific field has failed, a discrepancy (mismatch) in recognition of a common beam between a UE and a base station arises.

Figure 8A:
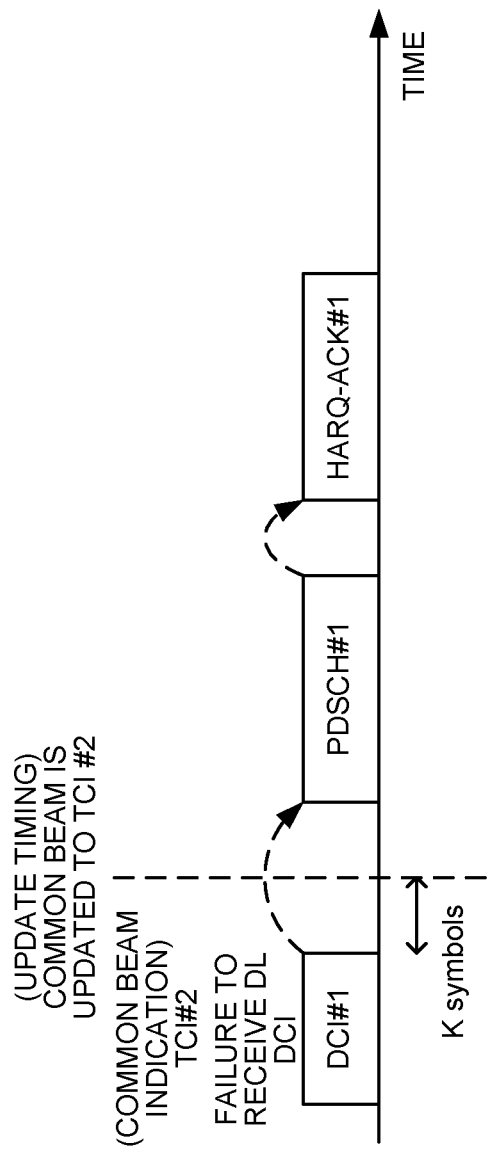
FIGS. 8A and 8B are each a diagram to show an example of failure to receive DCI according to the first embodiment.
Figure 8B:
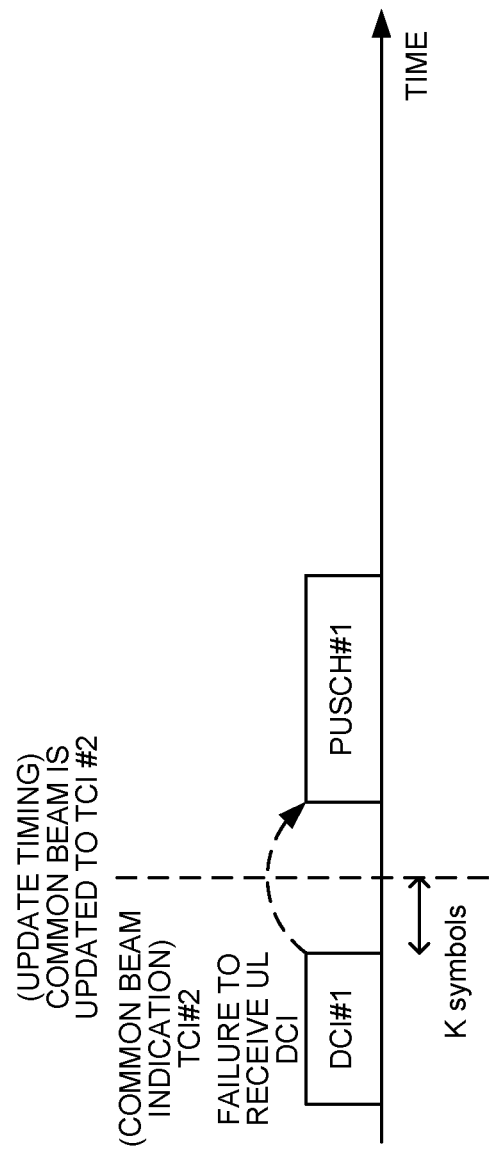

FIGS. 8A and 8B show a case where the UE has failed to receive the DCI to indicate TCI #2 as the common beam in the examples of FIGS. 7A and 7B of the first embodiment. In this case, the UE assumes that the common beam is not updated. On the other hand, the common beam is updated to TCI #2.

The common beam may be updated after specific time from transmission of HARQ-ACK information associated with the DCI (to indicate the common beam) including the specific field (update timing).

The specific time may be K symbols. K may be defined in specifications, may be configured by a higher layer, or may be reported by the UE as a UE capability.

Figure 9A:
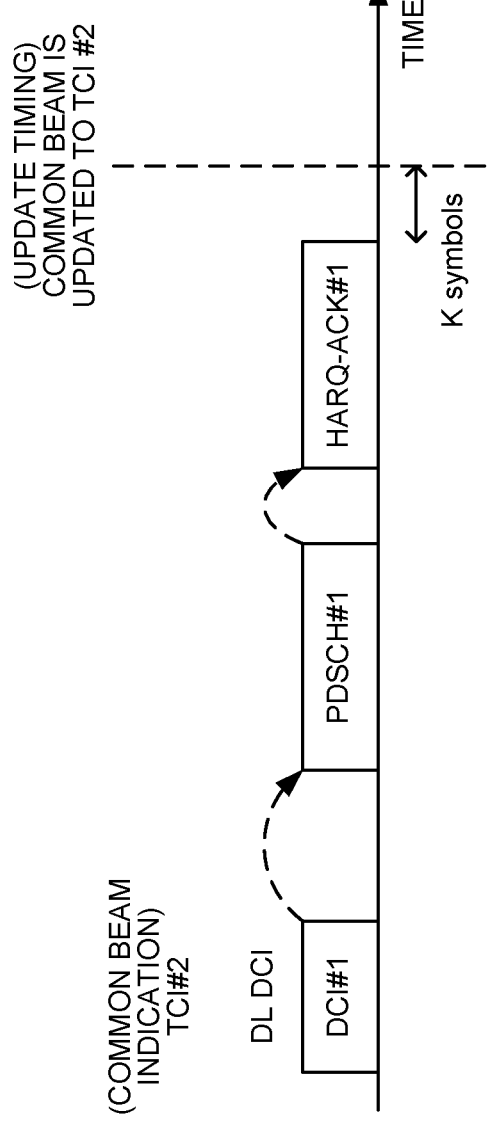
FIGS. 9A and 9B are each a diagram to show an example of an update timing according to a second embodiment.

In an example of FIG. 9A, the UE receives DL DCI to indicate TCI #2 as a common beam, receives a PDSCH scheduled by the DL DCI, and transmits HARQ-ACK information for the PDSCH. The common beam is updated to TCI #2 after K symbols from a final symbol of PUCCH/PUSCH transmission to deliver the HARQ-ACK information.

Figure 9B:
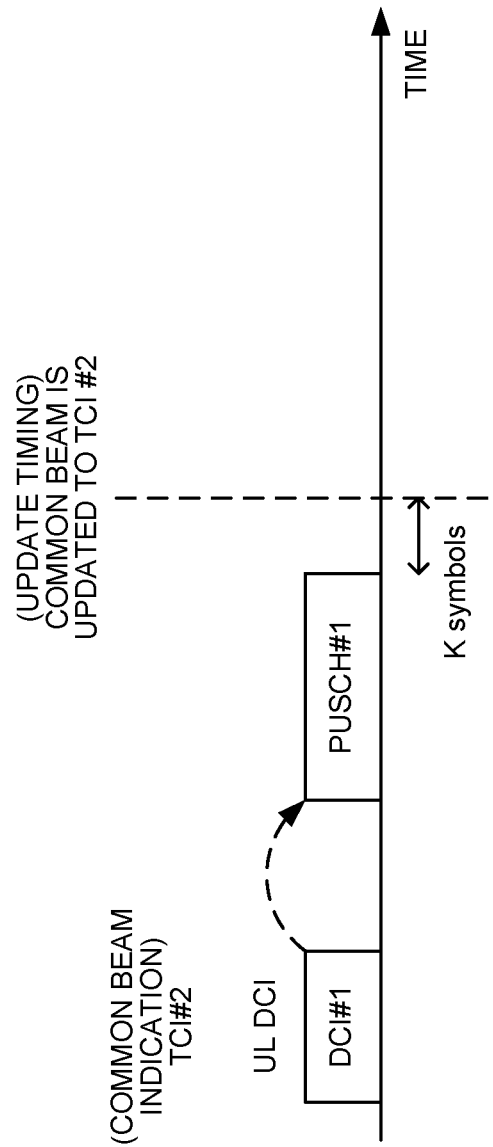

In an example of FIG. 9B, the UE receives UL DCI to indicate TCI #2 as the common beam, and transmits a PUSCH scheduled by the UL DCI. This PUSCH corresponds to HARQ-ACK information. The common beam is updated to TCI #2 after K symbols from a final symbol of the PUSCH transmission.

A case that it is not assumed that the UE receives DCI including both an existing TCI field and a new field for common beam indication may be defined. Therefore, DCI overhead can be suppressed.

The UE may receive the DCI including both of the existing TCI field and the new field for common beam indication. A PDSCH/PUCCH/PUSCH beam before the common beam update timing is indicated by the existing TCI field, and the common beam is indicated by the new field for common beam indication, thereby allowing the PDSCH/PUCCH/PUSCH beam before the common beam update timing to be indicated more quickly/more flexibly.

The above-described HARQ-ACK information transmission may be transmission of ACK or NACK, or may be only transmission of the ACK. When the HARQ-ACK information transmission is only transmission of the ACK, reliability can be enhanced. The probability of misrecognizing the ACK as the NACK is about 0.1%. The probability of misrecognizing the NACK as the ACK is higher. Thus, when the HARQ-ACK information transmission is only transmission of the ACK, the probability of occurrence of misrecognition of the common beam can be suppressed to about 0.1% or less.

When reception of the DCI (including the specific field) to indicate the common beam has failed, the UE may not transmit the HARQ-ACK information/PUSCH. The base station can recognize that the reception of the DCI has failed. The common beam may not be updated.

Figure 10A:
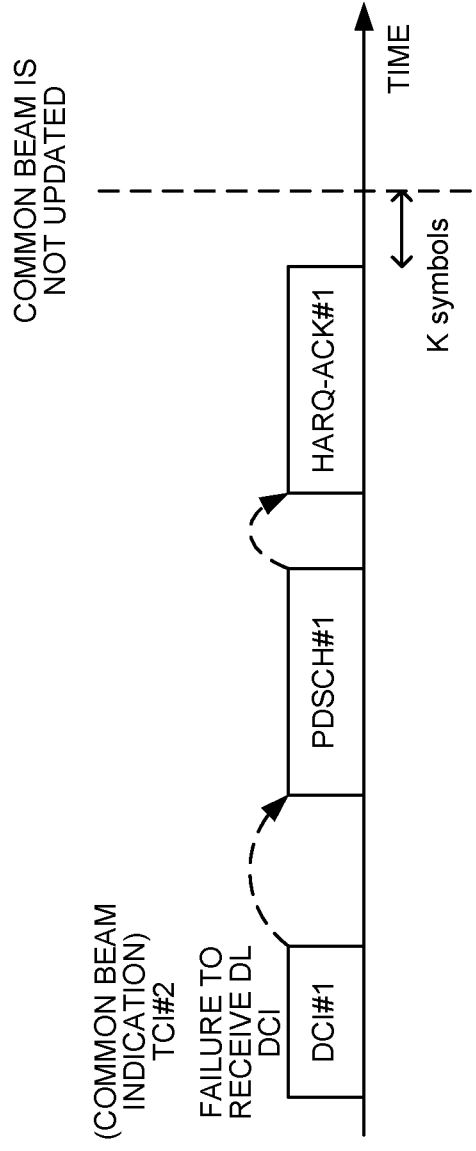
FIGS. 10A and 10B are each a diagram to show an example of failure to receive DCI according to the second embodiment.

In an example of FIG. 10A, when the UE has failed to receive DL DCI to indicate TCI #2 as a common beam, reception of a PDSCH scheduled by the DL DCI and transmission of HARQ-ACK information for the PDSCH are not performed. In this case, the common beam is not updated.

Figure 10B:
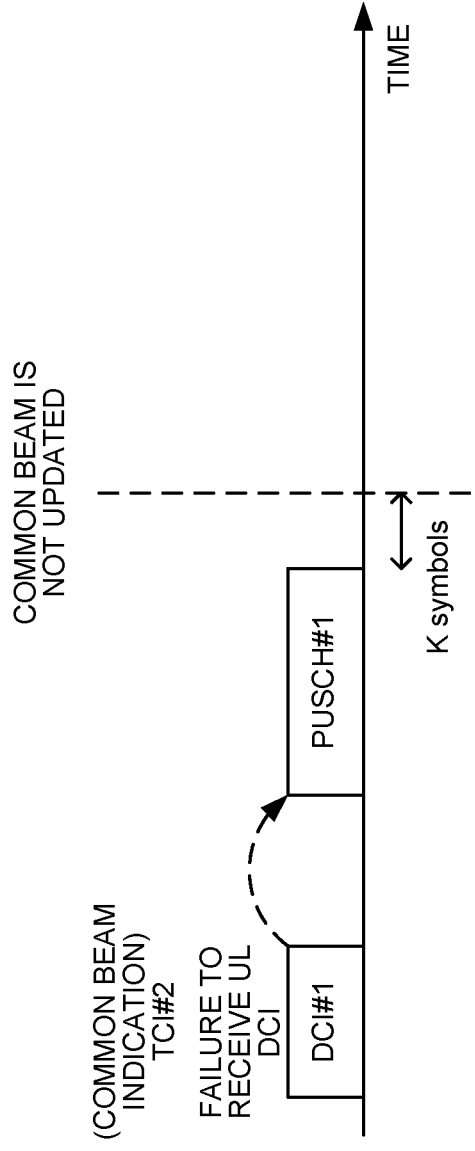

In an example of FIG. 10B, when the UE has failed to receive UL DCI to indicate TCI #2 as the common beam, transmission of a PUSCH scheduled by the UL DCI is not performed. In this case, the common beam is not updated.

The UE may receive retransmission of the DCI (including the specific field) to indicate the common beam (common beam indicated by the DCI with the reception failure).

The UE may follow at least one of aspect 2-1 to aspect 2-3 below.

<<Aspect 2-1>>

A plurality of scheduling processes are performed, and whether a common beam indicated by one piece of DCI is applied to a channel scheduled by another piece of DCI is indefinite.

Figure 11:
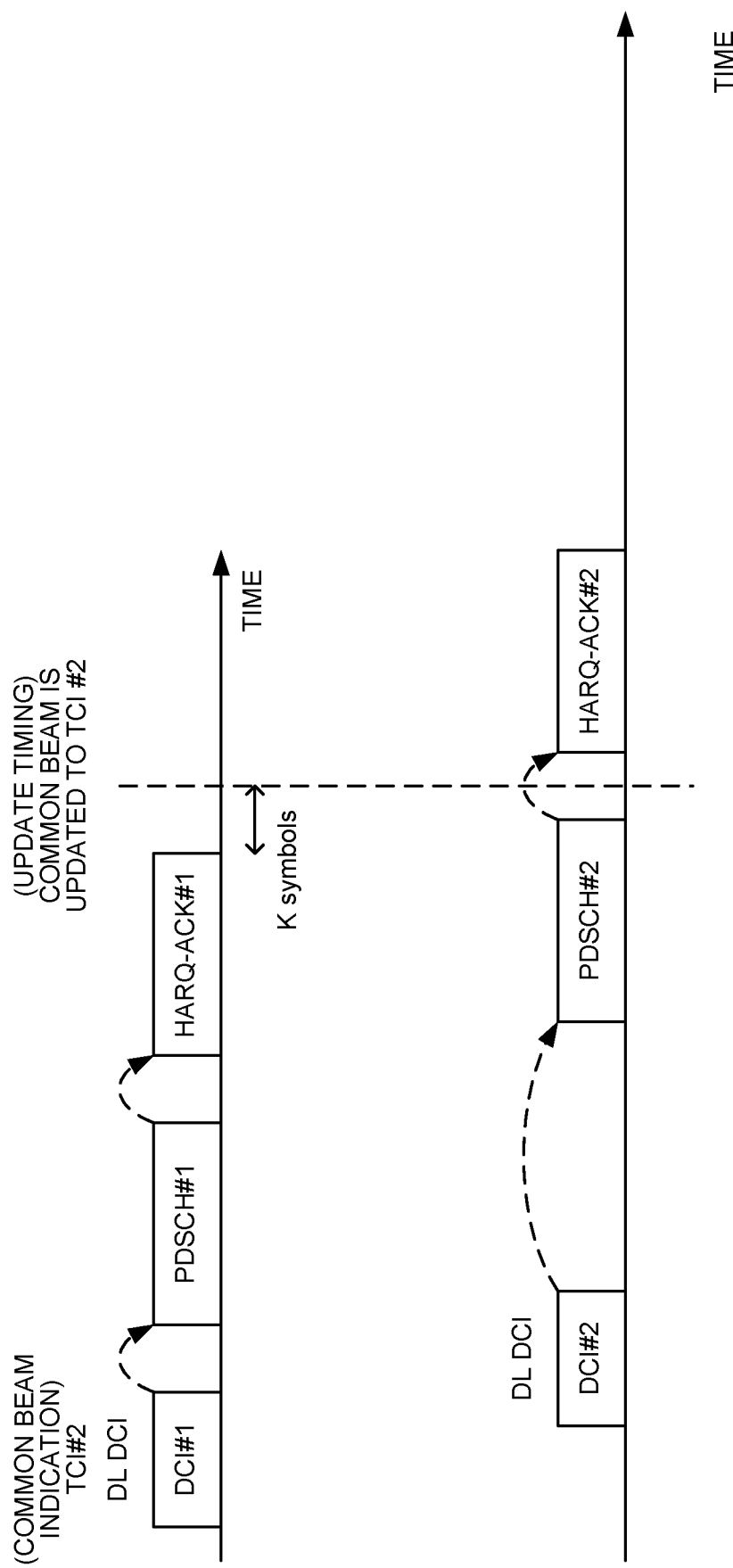
FIG. 11 is a diagram to show an example of aspect 2-1.

In an example of FIG. 11, the UE receives DL DCI #1 to indicate TCI #2 as a common beam, receives PDSCH #1 scheduled by the DL DCI, and transmits HARQ-ACK information #1 for the PDSCH. The common beam is updated to TCI #2 after K symbols from a final symbol of PUCCH/PUSCH transmission to deliver the HARQ-ACK information (update timing). Furthermore, the UE receives DL DCI #2 after DL DCI #1, receives PDSCH #2 scheduled by DL DCI #2, and transmits HARQ-ACK information #2 for the PDSCH. Here, when the timing at which the common beam is updated to TCI #2 is timing after the reception of PDSCH #2 and before the transmission of HARQ-ACK information #2, whether the updated common beam is applied to the transmission of HARQ-ACK information #2 is indefinite.

The UE may follow any one of aspect 2-1-A and aspect 2-1-B below.

[Aspect 2-1-A]

TCI #2 may be applied to transmission of HARQ-ACK information #2. In this case, a time line is simple, and complexity of UE operation can be suppressed.

[Aspect 2-1-B]

TCI #2 may not be applied to transmission of HARQ-ACK information #2. A beam for a PDSCH/HARQ-ACK information may be determined on the basis of (common) beam assumption for DCI to schedule the PDSCH/HARQ-ACK information. In this case, in one scheduling process, the same/common beam can be used for the DCI and the PDSCH/HARQ-ACK information scheduled by the DCI.

<<Aspect 2-2>>

When a common beam is updated in one resource for a PDSCH/HARQ-ACK information/PUCCH/PUSCH/CSI-RS/SRS, what will happen is indefinite.

Figure 12:
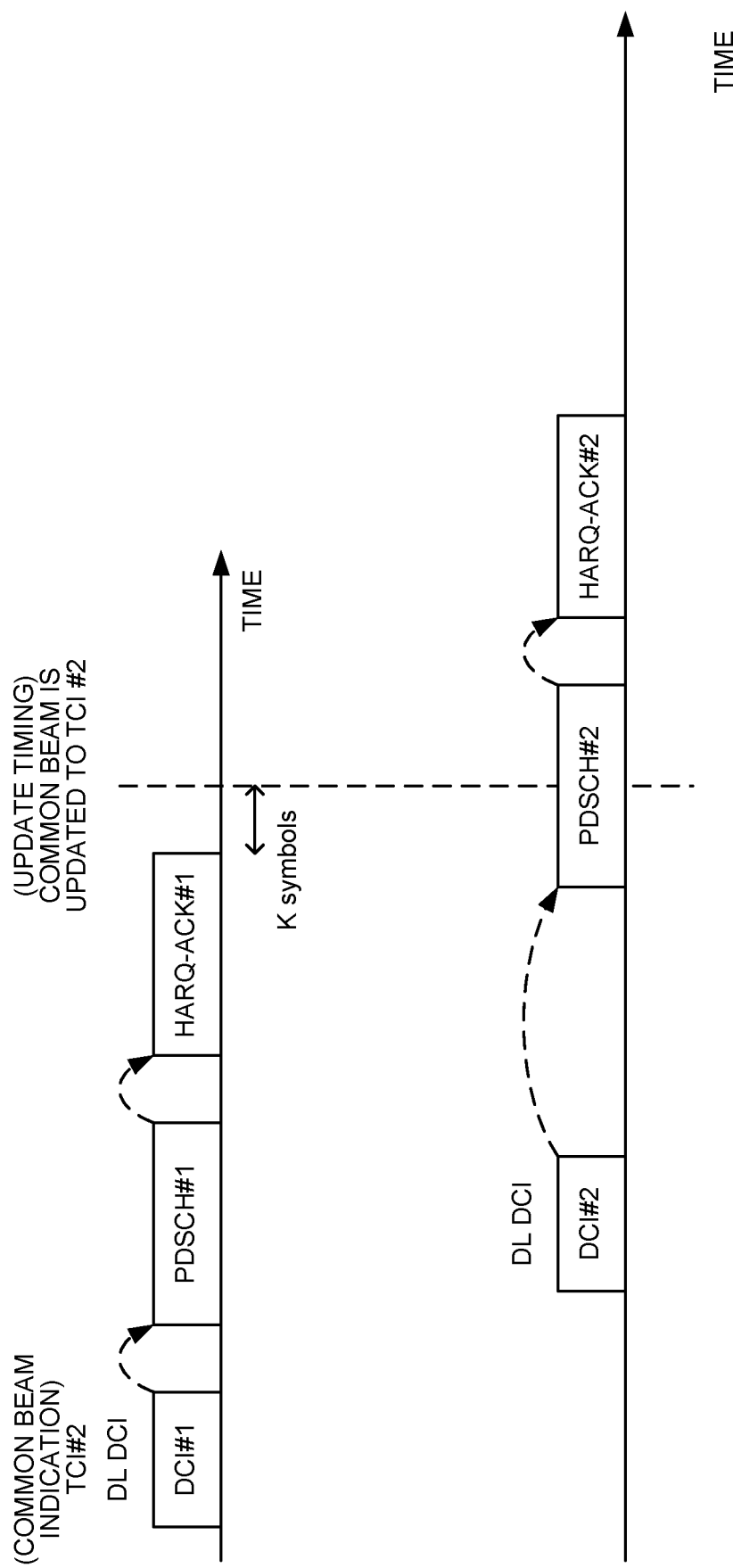
FIG. 12 is a diagram to show an example of aspect 2-2.

In an example of FIG. 12, the UE receives DL DCI #1 to indicate TCI #2 as a common beam, receives PDSCH #1 scheduled by the DL DCI, and transmits HARQ-ACK information #1 for the PDSCH. The common beam is updated to TCI #2 after K symbols from a final symbol of PUCCH/PUSCH transmission to deliver the HARQ-ACK information (update timing). Furthermore, the UE receives DL DCI #2 after DL DCI #1, receives PDSCH #2 scheduled by DL DCI #2, and transmits HARQ-ACK information #2 for the PDSCH. Here, when the timing at which the common beam is updated to TCI #2 is in a time domain resource for PDSCH #2, how operation is performed is indefinite.

The UE may follow any one of aspect 2-2-A and aspect 2-2-B below.

[Aspect 2-2-A]

The common beam may be strictly assumed. Specifically, the beam assumption may be changed in the time domain resource for PDSCH #2. In this case, a time line is simple, and complexity of UE operation can be suppressed.

[Aspect 2-2-B]

A common beam for a first symbol of PDSCH #2 may be assumed. Specifically, the common beam before the update may be used for entire PDSCH #2 reception. In this case, degradation in demodulation performance can be avoided.

<<Aspect 2-3>>

Which TCI state is applied to DCI/PDSCH retransmission/HARQ-ACK information for the retransmission is indefinite.

Figure 13:
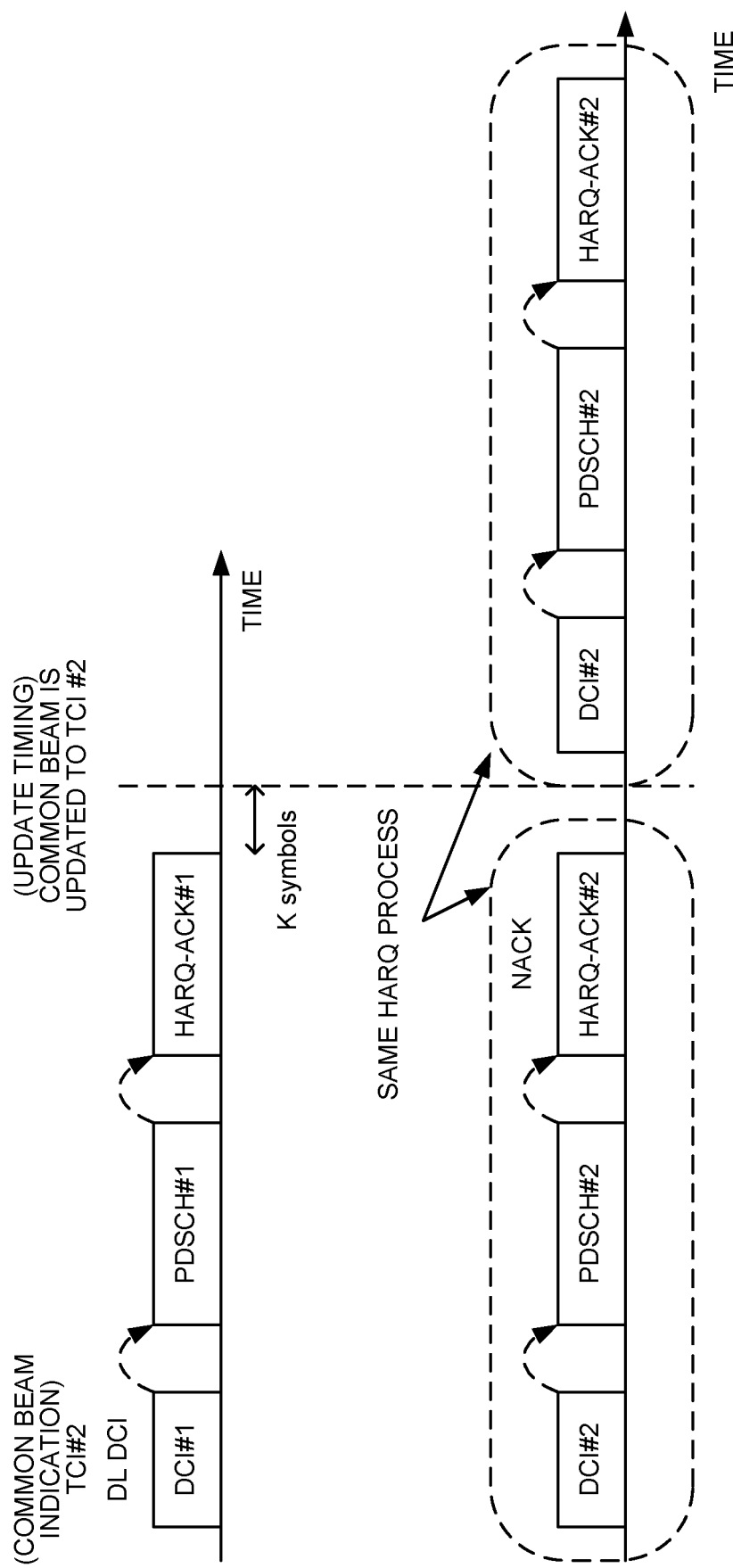
FIG. 13 is a diagram to show an example of aspect 2-3.

In an example of FIG. 13, the UE receives DL DCI #1 to indicate TCI #2 as a common beam, receives PDSCH #1 scheduled by the DL DCI, and transmits HARQ-ACK information #1 for the PDSCH. The common beam is updated to TCI #2 after K symbols from a final symbol of PUCCH/PUSCH transmission to deliver the HARQ-ACK information (update timing). Furthermore, the UE receives DL DCI #2, receives PDSCH #2 scheduled by DL DCI #2, and transmits HARQ-ACK information #2 for the PDSCH. Here, when HARQ-ACK information #2 is NACK, subsequently, the UE receives retransmission of DCI #2 and retransmission of PDSCH #2, and transmits HARQ-ACK information #2 for the PDSCH. When the timing at which the common beam is updated to TCI #2 is timing after the transmission of HARQ-ACK information #2 and before the retransmission of DCI #2, which TCI state is applied to the retransmission of DCI #2, retransmission of PDSCH #2, and transmission of HARQ-ACK information #2 for the PDSCH for is indefinite.

The UE may follow any one of aspect 2-3-A and aspect 2-3-B below.

[Aspect 2-3-A]

The common beam may be strictly assumed. Specifically, beam assumption for the retransmission (second DCI #2/PDSCH #2/HARQ-ACK information #2) may be based on timing of actual transmission/reception. In this case, a time line is simple, and complexity of UE operation can be suppressed.

[Aspect 2-3-B]

A common beam for initial transmission may be assumed (applied) for retransmission. Specifically, the common beam before the update may be used for transmission/reception of the retransmission (second DCI #2/PDSCH #2/HARQ-ACK information #2).

According to a second embodiment described above, a discrepancy in recognition of a common beam between a UE and a base station can be avoided even when the UE has failed to receive DCI to indicate the common beam.

Third Embodiment

It is conceivable that a discrepancy in recognition of a current common beam between a UE and a base station occurs.

If a common beam indicated by DL DCI is updated after specific time from transmission of ACK corresponding to the DL DCI, the probability of occurrence of a discrepancy in recognition of the common beam can be suppressed to about 0.1% or less (the probability of misrecognizing NACL as ACK). As shown in FIG. 14A, the base station fails to distinguish between case (a) where reception of the DL DCI fails and case (b) where reception of the DL DCI succeeds, and reception of HARQ-ACK information corresponding to the DL DCI fails. The probability of occurrence of these cases is about 0.1% or less, and will not become a big issue.

On the other hand, if a common beam indicated by UL DCI is updated after specific time from transmission of a PUSCH corresponding to the UL DCI, the probability of occurrence of a discrepancy in recognition of the common beam is higher (for example, about 1% to 10%). As shown in FIG. 14B, the base station fails to distinguish between case (c) where reception of the UL DCI fails and case (d) where reception of the UL DCI succeeds, and reception of the PUSCH corresponding to the UL DCI fails. The probability of occurrence of these cases is higher.

The UE may follow at least one of aspect 3-1 and aspect 3-2 below.

<<Aspect 3-1>>

Only the DL DCI may include a specific field for common beam indication. According to this aspect, reliability can be enhanced. A discrepancy in recognition of a common beam for UL and DL can be avoided.

When separate TCI state pools are configured/indicated for the UL and DL, how to update a UL TCI state in a UL TCI state pool becomes an issue.

The UE may follow any one of aspect 3-1-1 and aspect 3-1-2 below.

[Aspect 3-1-1]

The DL DCI may have two specific fields. The two respective specific fields may indicate a UL common beam and a DL common beam. The DL DCI may update both a UL TCI state and a DL TCI state.

[Aspect 3-1-2]

The DL DCI may have one specific field. The one specific field may jointly indicate a UL common beam and a DL common beam. As shown in an example of FIG. 15, each of values (codepoints) of the specific field may be associated with a combination of a UL TCI state (TCI state ID) and a DL TCI state (TCI state ID). This association may be defined in specifications, may be configured by RRC, or may be indicated by a MAC/CE.

<<Aspect 3-2>>

If the UE receives UL DCI including a specific field for common beam indication, the UE may transmit HARQ-ACK information on a PUCCH/PUSCH. According to this aspect, reliability can be enhanced. This aspect is effective for a case where separate TCI state pools are configured/indicated for the UL and DL. A structure of the DL DCI is not influenced. The DL DCI may include one specific field for common beam indication.

The UE may follow any one of aspect 3-2-1 to aspect 3-2-3 below.

[Aspect 3-2-1]

The UL DCI may include a PUCCH resource indicator (PRI) field, an HARQ timing indicator field, and a transmit power control (TPC) command field. The PRI field and the HARQ timing indicator field may be used for determination of a resource for a PUCCH/PUSCH to deliver HARQ-ACK information for the UL DCI. The TPC command field may be used for determination of transmit power for the PUCCH/PUSCH to deliver the HARQ-ACK information for the UL DCI.

[Aspect 3-2-2]

The UL DCI may not include the PUCCH resource indicator field, the HARQ timing indicator field, and the transmit power control (TPC) command field. The PRI field and the HARQ timing indicator field in last received DL DCI may be used for determination of the resource for the PUCCH/PUSCH to deliver the HARQ-ACK information for the UL DCI. The TPC command field in the last received DL DCI may be used for determination of the transmit power for the PUCCH/PUSCH to deliver the HARQ-ACK information for the UL DCI.

[Aspect 3-2-3]

The UL DCI may not include the PUCCH resource indicator field, the HARQ timing indicator field, and the transmit power control (TPC) command field. The resource for the PUCCH/PUSCH to deliver the HARQ-ACK information for the UL DCI may be determined on the basis of at least one of configuration by a higher layer, indication by the UL DCI, and the last received DL DCI. The transmit power for the PUCCH/PUSCH to deliver the HARQ-ACK information for the UL DCI may be determined on the basis of at least one of configuration by the higher layer, indication by the UL DCI, and the last received DL DCI. In this case, closed-loop TPC may not be supported.

According to a third embodiment described above, a discrepancy in recognition of a common beam between a UE and a base station can be avoided.

Fourth Embodiment

A UE capability corresponding to at least one function (characteristic, feature) in the first to third embodiments may be defined. When a UE has reported this UE capability, the UE may perform a corresponding function. When the UE has reported this UE capability, and a higher layer parameter corresponding to this function has been configured, the UE may perform a corresponding function. The higher layer parameter (RRC information element) corresponding to this function may be defined. When this higher layer parameter has been configured, the UE may perform a corresponding function.

The UE capability may indicate whether the UE supports this function.

The UE capability may indicate a maximum number of TCI states (in a pool) configured for the UE by RRC. This number may be reported for all of UL and DL, or may be separately reported for each of the UL and DL.

The UE capability may indicate a maximum number of active TCI states supported by the UE. This number may be reported for all of UL and DL, or may be separately reported for each of the UL and DL.

The UE capability may indicate whether the UE supports different active TCI state pools for the UL and DL.

The UE capability may indicate whether the UE supports default QCL assumption. The UE capability may indicate whether the UE supports a case that time offset for PDSCH/PUSCH scheduling is less than a threshold value.

According to a fourth embodiment described above, the UE can achieve the above-described function while maintaining compatibility with existing specifications.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 16:
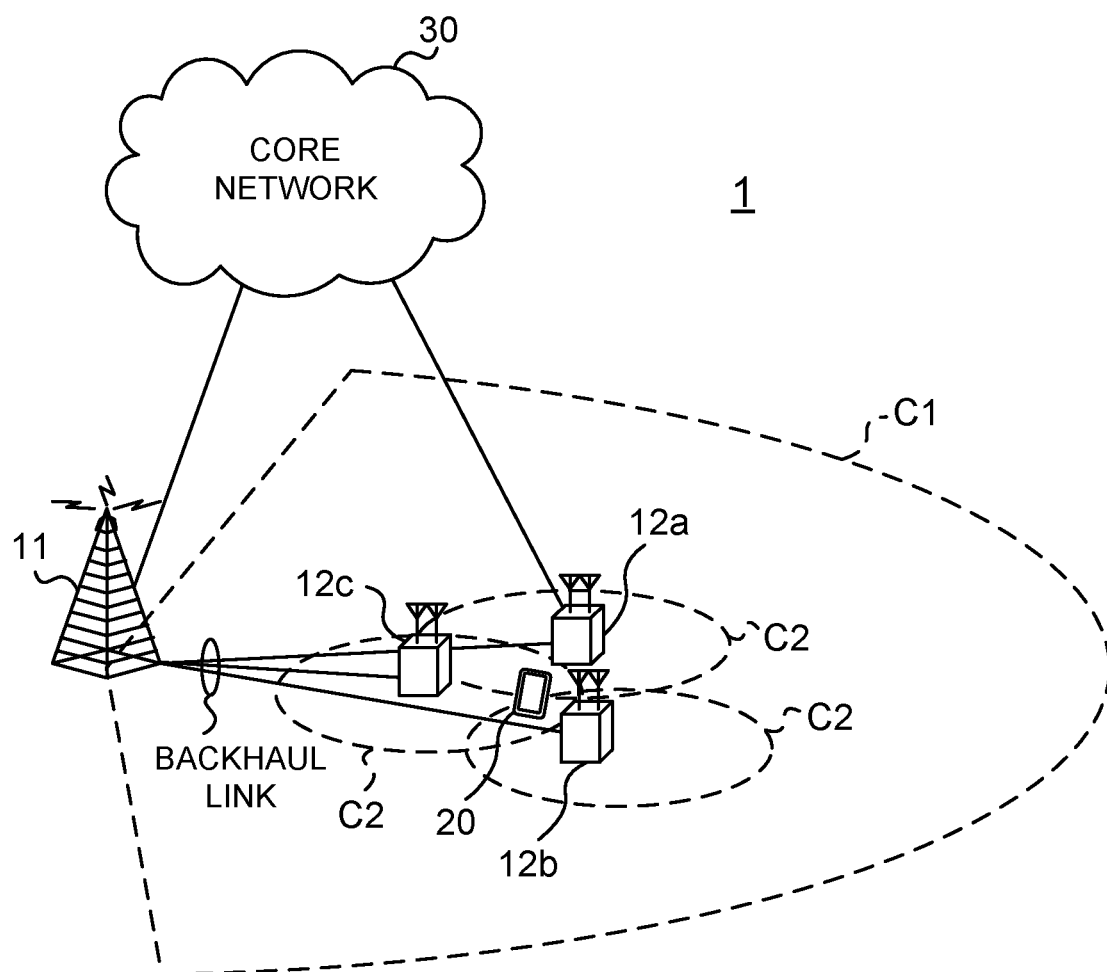
FIG. 16 is a diagram to show an example of a schematic structure of a radio communication system according to one embodiment.

FIG. 16 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB)

donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 17:
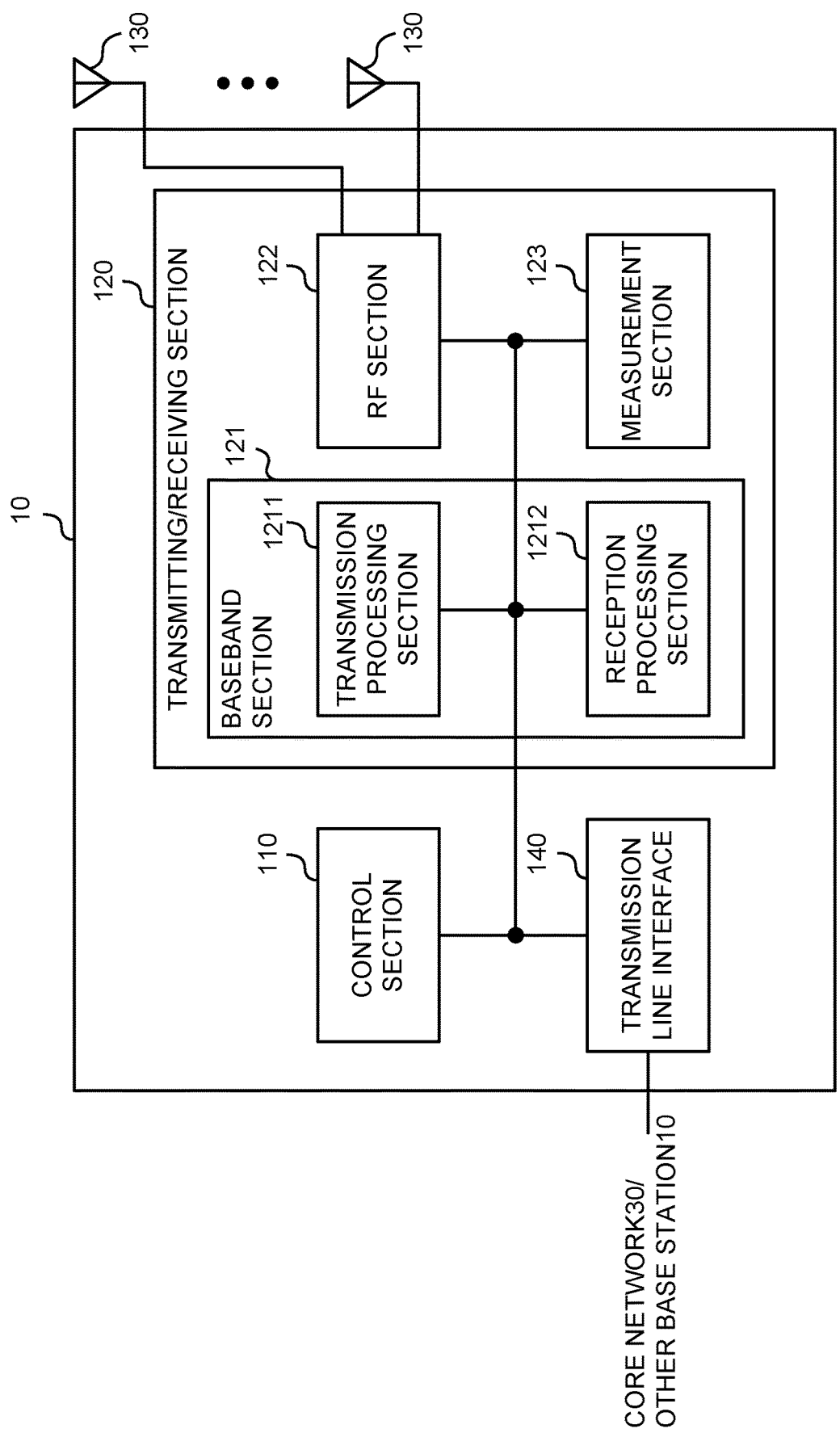
FIG. 17 is a diagram to show an example of a structure of a base station according to one embodiment.

FIG. 17 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212.

The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains. The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

The transmitting/receiving section 120 may transmit TCI state information indicating a plurality of transmission configuration indication (TCI) states applicable to multiple types of channels, and may transmit first downlink control information indicating one TCI state of the plurality of TCI states. The control section 110 may apply the one TCI state to a first signal after timing at which specific time passes from any one of the first downlink control information and a first uplink channel based on the first downlink control information.

The transmitting/receiving section 120 may transmit TCI state information indicating a plurality of transmission configuration indication (TCI) states applicable to multiple types of channels, and may transmit at least one of first downlink control information to schedule a downlink channel and second downlink control information to an uplink channel. The control section 110 may apply, to reception of an uplink signal, any one of a first TCI state indicated by the first downlink control state, out of the plurality of TCI states, and a second TCI state indicated by the second downlink control state, out of the plurality of TCI states.

(User Terminal)

Figure 18:
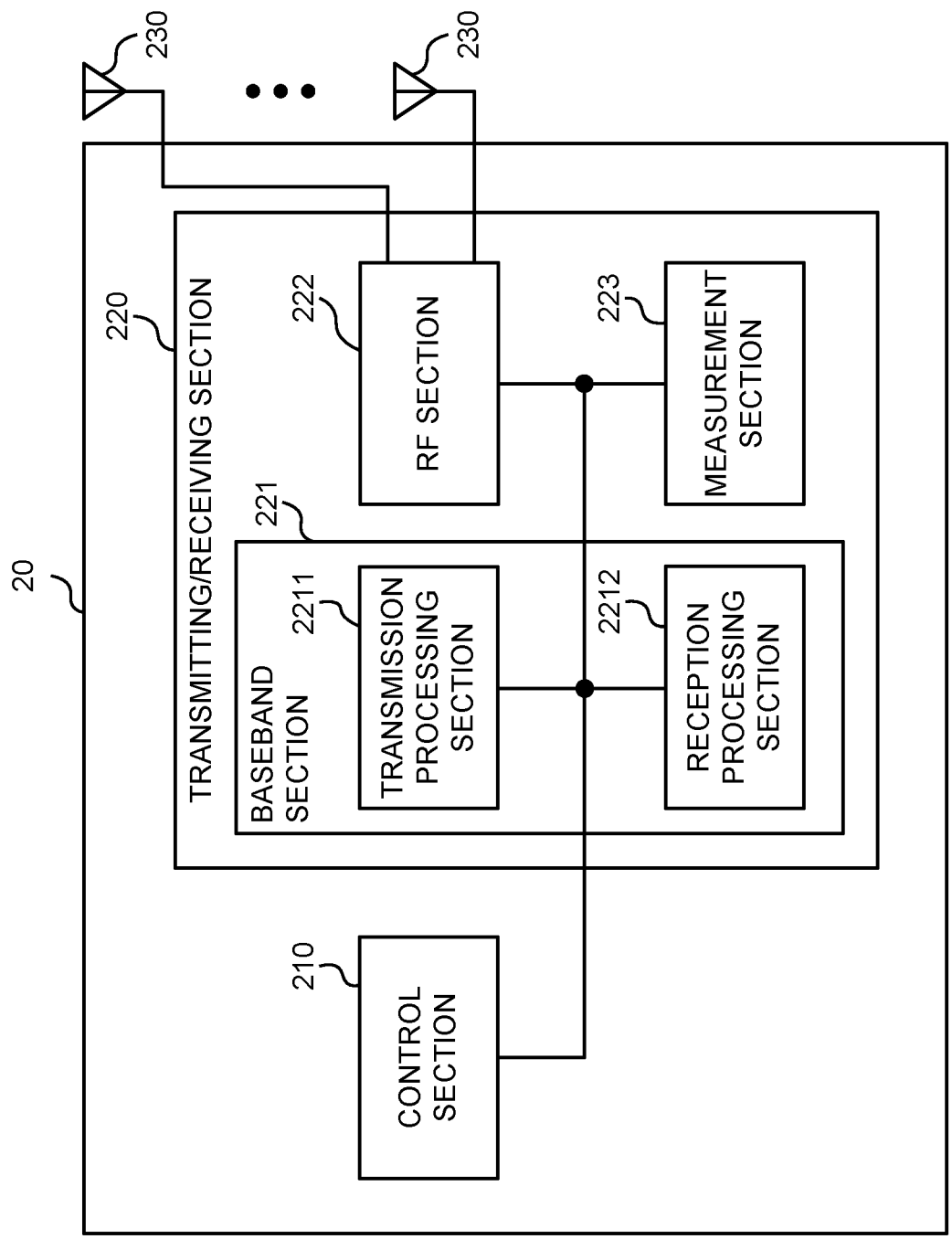
FIG. 18 is a diagram to show an example of a structure of a user terminal according to one embodiment.

FIG. 18 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal.

For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive TCI state information (for example, a common TCI state pool configured/activated by RRC/MAC CE) indicating a plurality of transmission configuration indication (TCI) states applicable to multiple types of channels, and may receive first downlink control information indicating one TCI state (for example, common beam or common TCI state) of the plurality of TCI states. The control section 210 may apply the one TCI state to a first signal after timing at which specific time passes from any one of the first downlink control information (first embodiment) and a first uplink channel based on the first downlink control information (second embodiment).

When a first uplink signal is based on second downlink control information before the timing, and starts after the timing, the control section 210 may apply, to the first uplink signal, any one of the one TCI state and a TCI state before update by the first downlink control information (aspect 2-1).

When the timing is in a time domain resource for a second signal, the control section 210 may perform any one of changing a TCI state applied to the second signal at the timing and applying, to the entire second signal, a TCI state applied to a first symbol of the second signal (aspect 2-2).

When retransmission of a third signal (for example, a PDCCH/PDSCH/PUCCH/PUSCH/HARQ-ACK information) before the timing starts after the timing, the control section 210 may apply, to the retransmission, any one of the one TCI state and a TCI state applied to the third signal (aspect 2-3).

The transmitting/receiving section 220 may receive TCI state information (for example, a common TCI state pool configured/activated by RRC/MAC CE) indicating a plurality of transmission configuration indication (TCI) states applicable to multiple types of channels, and may receive at least one of first downlink control information to schedule a downlink channel and second downlink control information to schedule an uplink channel. The control section 210 may apply, to transmission of an uplink signal, any one of a first TCI state (for example, common beam or common TCI state) indicated by the first downlink control state, out of the plurality of TCI states, and a second TCI state (for example, common beam or common TCI state) indicated by the second downlink control state, out of the plurality of TCI states.

The first downlink control information may indicate the first TCI state applied to the uplink signal and a TCI state applied to a downlink signal (aspect 3-1).

The control section 210 may determine, on the basis of the second downlink control information, at least one of a resource and transmit power for the uplink signal, and the second TCI state (aspect 3-2-1).

The control section 210 may determine the second TCI state on the basis of the second downlink control information, and may determine at least one of a resource and transmit power for the uplink signal on the basis of at least one of the first downlink control information and a higher layer parameter (aspect 3-2-2, aspect 3-2-3).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 19:
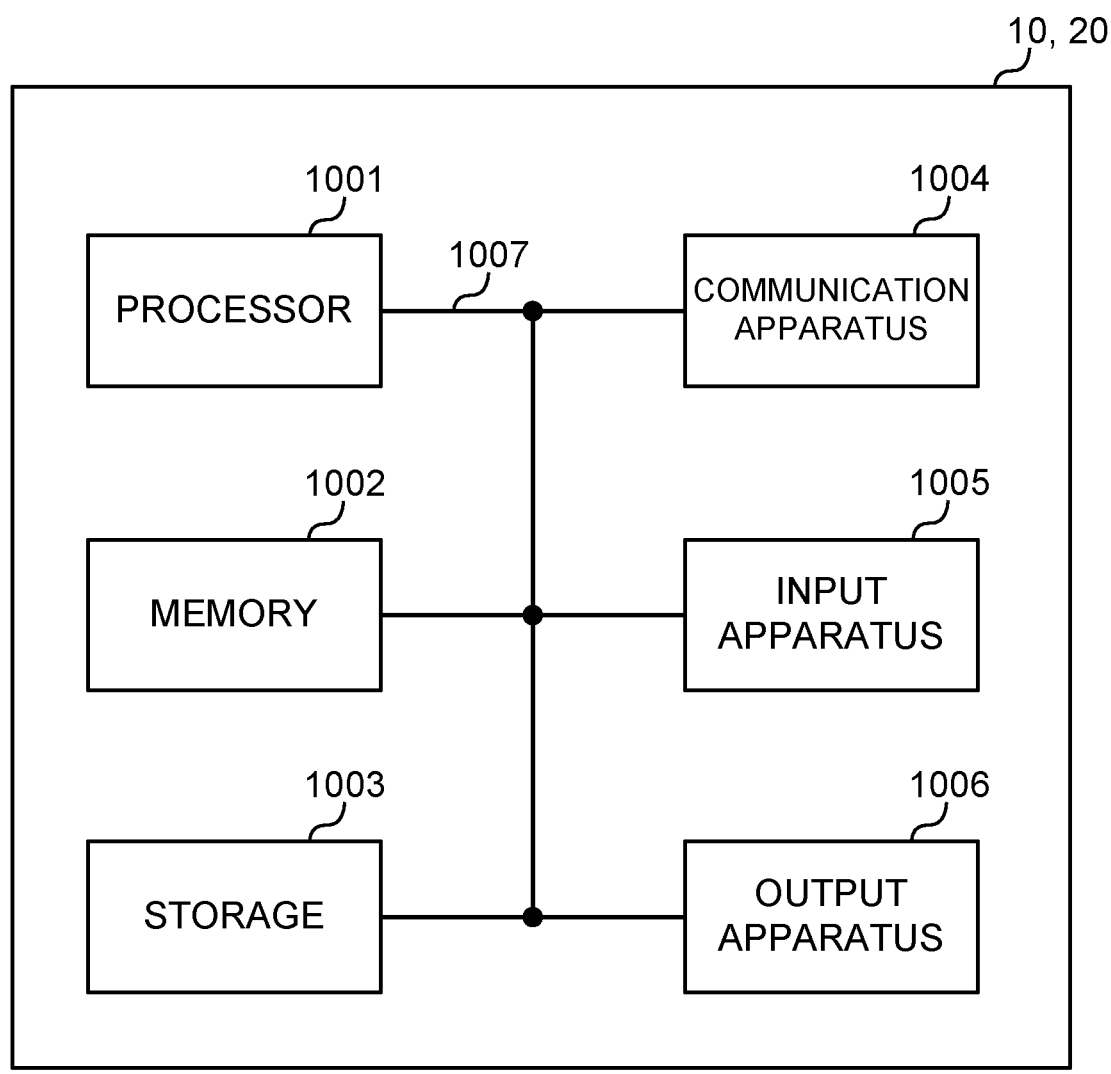
FIG. 19 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 19 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAN), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

VARIATIONS

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (PAT), New Radio (NR), New radio access (NX), Future generation radio access (FX), Global System for Mobile communications (GSM (registered trademark)), CDMA 2000, Ultra Mobile Broadband (U4B), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
    a receiver that receives transmission configuration indication (TCI) state information indicating multiple TCI states applicable to at least one of a physical downlink shared channel (PDSCH) and a physical downlink control channel (PDCCH), and receives first downlink control information indicating one TCI state among the multiple TCI states; and
    a processor that applies the one TCI state to a first signal that is after a timing at which a specific time passes from acknowledgement (ACK) transmission of hybrid automatic repeat request ACK (HARQ-ACK) information associated with the first downlink control information including a specific field,
    wherein the multiple TCI states indicated by the TCI state information are applied to at least one of a physical uplink shared channel (PUSCH) and a physical uplink control channel (PUCCH), and
    wherein the multiple TCI states are further applied to at least one of a channel state information reference signal (CSI-RS) and a sounding reference signal (SRS).

2. The terminal according to claim 1, wherein the specific time is indicated by a number of symbols and is configured by a higher layer.

3. The terminal according to claim 1, wherein the processor applies the one TCI state to the first signal that is after the timing at which the specific time passes from a last symbol of PUCCH or PUSCH transmission carrying the HARQ-ACK information.

4. A radio communication method for a terminal, comprising:
    receiving transmission configuration indication (TCI) state information indicating multiple TCI states applicable to at least one of a physical downlink shared channel (PDSCH) and a physical downlink control channel (PDCCH), and receiving first downlink control information indicating one TCI state among the multiple TCI states; and
    applying the one TCI state to a first signal that is after a timing at which a specific time passes from acknowledgement (ACK) transmission of hybrid automatic repeat request ACK (HARQ-ACK) information associated with the first downlink control information including a specific field,
    wherein the multiple TCI states indicated by the TCI state information are applied to at least one of a physical uplink shared channel (PUSCH) and a physical uplink control channel (PUCCH), and
    wherein the multiple TCI states are further applied to at least one of a channel state information reference signal (CSI-RS) and a sounding reference signal (SRS).

5. A base station comprising:
    a transmitter that transmits transmission configuration indication (TCI) state information indicating multiple TCI states applicable to at least one of a physical downlink shared channel (PDSCH) and a physical downlink control channel (PDCCH), and transmits first downlink control information indicating one TCI state among the multiple TCI states; and
    a processor that applies the one TCI state to a first signal that is after a timing at which a specific time passes from acknowledgement (ACK) transmission of hybrid automatic repeat request ACK (HARQ-ACK) information associated with the first downlink control information including a specific field,
    wherein the multiple TCI states indicated by the TCI state information are applied to at least one of a physical uplink shared channel (PUSCH) and a physical uplink control channel (PUCCH), and
    wherein the multiple TCI states are further applied to at least one of a channel state information reference signal (CSI-RS) and a sounding reference signal (SRS).

6. A system comprising a terminal and a base station, wherein the terminal comprises:
- a receiver that receives transmission configuration indication (TCI) state information indicating multiple TCI states applicable to at least one of a physical downlink shared channel (PDSCH) and a physical downlink control channel (PDCCH), and receives first downlink control information indicating one TCI state among the multiple TCI states; and
- a processor that applies the one TCI state to a first signal that is after a timing at which a specific time passes from acknowledgement (ACK) transmission of hybrid automatic repeat request ACK (HARQ-ACK) information associated with the first downlink control information including a specific field, and the base station comprises:
- a transmitter that transmits the TCI state information and transmits the first downlink control information; and
- a processor that applies the one TCI state to the first signal,
- wherein the multiple TCI states indicated by the TCI state information are applied to at least one of a physical uplink shared channel (PUSCH) and a physical uplink control channel (PUCCH), and
- wherein the multiple TCI states are further applied to at least one of a channel state information reference signal (CSI-RS) and a sounding reference signal (SRS).

* * * * *